US012772003B2

(12) United States Patent
Wan et al.

(10) Patent No.: US 12,772,003 B2
(45) Date of Patent: Oct. 20, 2026

(54) VIBRATING DIAPHRAGM AND LOUDSPEAKER

(71) Applicant: MERRY ELECTRONICS (SUZHOU) CO., LTD., Jiangsu Province (CN)

(72) Inventors: Huaming Wan, Jiangsu Province (CN); Mingya Luo, Jiangsu Province (CN); Liguo Rao, Jiangsu Province (CN); Chunlong Zheng, Jiangsu Province (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 212 days.

(21) Appl. No.: 18/649,243

(22) Filed: Apr. 29, 2024

(65) Prior Publication Data

US 2024/0381028 A1 Nov. 14, 2024

(30) Foreign Application Priority Data

May 9, 2023 (CN) ......................... 202321102861.1
Aug. 31, 2023 (CN) ......................... 202322363692.3

(51) Int. Cl.

| | |
|---|---|
| ***H04R 7/06*** | (2006.01) |
| ***H04R 1/06*** | (2006.01) |
| ***H04R 7/18*** | (2006.01) |
| ***H04R 7/26*** | (2006.01) |
| ***H04R 9/02*** | (2006.01) |
| ***H04R 9/04*** | (2006.01) |
| ***H04R 9/06*** | (2006.01) |

(52) U.S. Cl.
CPC ................. *H04R 7/06* (2013.01); *H04R 1/06* (2013.01); *H04R 7/18* (2013.01); *H04R 7/26* (2013.01); *H04R 9/025* (2013.01); *H04R 9/046* (2013.01); *H04R 9/06* (2013.01); *H04R 2307/025* (2013.01); *H04R 2307/027* (2013.01); *H04R 2400/11* (2013.01)

(58) Field of Classification Search
None
See application file for complete search history.

(56) References Cited

FOREIGN PATENT DOCUMENTS

| | | | | |
|---|---|---|---|---|
| CN | 207235104 U | | 4/2018 | |
| CN | 113038347 A | * | 6/2021 | ............. H04R 9/045 |
| CN | 216291423 U | | 4/2022 | |

(Continued)

*Primary Examiner* — Walter F Briney, III
(74) *Attorney, Agent, or Firm* — Birch, Stewart, Kolasch & Birch, LLP

(57) ABSTRACT

Embodiments of the disclosure disclose a vibrating diaphragm and a loudspeaker. The vibrating diaphragm includes a first diaphragm layer, a first conductive metal layer and a second diaphragm layer which are stacked sequentially. The first conductive metal layer includes two metal foils. Each of the metal foils includes a first conductive part, a second conductive part, and a first supporting part arranged between the first conductive part and the second conductive part. The second diaphragm layer is provided with a plurality of leaks to expose the first conductive part and the second conductive part. Therefore, the metal foils are integrated between the first diaphragm layer and the second diaphragm layer, so that the space occupied by the metal foils may be reduced to simplify the conduction design of the loudspeaker, and the metal foils may be protected to avoid the breakage of the metal foils.

9 Claims, 11 Drawing Sheets

(56) References Cited

FOREIGN PATENT DOCUMENTS

| | | | | | |
|---|---|---|---|---|---|
| CN | 114554368 | A | * | 5/2022 | ............... H04R 7/04 |
| CN | 218634280 | U | | 3/2023 | |
| WO | WO-2022006931 | A1 | * | 1/2022 | ............... H04R 9/06 |

* cited by examiner

VIBRATING DIAPHRAGM AND LOUDSPEAKER

CLAIM OF PRIORITY AND CROSS-REFERENCE TO RELATED APPLICATION(S)

This application claims the benefits of Chinese Patent Application No. 202322363692.3, filed on Aug. 31, 2023, and Chinese Patent Application No. 202321102861.1, filed on May 9, 2023, which are incorporated herein by reference in their entireties.

BACKGROUND OF THE INVENTION

1. Field of the Invention

The present invention relates to the field of acoustoelectric, and particularly to a vibrating diaphragm and a loudspeaker.

2. Description of the Related Art

Micro-loudspeakers on the current market are basically provided with a wire loop, or the conduction design of the wire loop is replaced with a flexible circuit board. These designs will occupy the design space of the loudspeaker, thereby causing the acoustic performance to be limited. Meanwhile, in the life experiment process of the loudspeaker, a bad phenomenon of the silent loudspeaker is caused due to the wire short circuit or the cracking of the flexible circuit board.

BRIEF DESCRIPTION OF THE INVENTION

In view of this, an objective of the disclosure is to provide a vibrating diaphragm and a loudspeaker. A first conductive metal layer composed of two metal foils is integrated between a first diaphragm layer and a second diaphragm layer, thereby simplifying the conduction design of the loudspeaker and protecting the metal foils.

According to a first aspect, embodiments of the disclosure provide a vibrating diaphragm. The vibrating diaphragm includes a first diaphragm layer, a first conductive metal layer and a second diaphragm layer which are stacked sequentially. The first conductive metal layer includes two metal foils. Each of the metal foils includes a first conductive part, a second conductive part, and a first supporting part arranged between the first conductive part and the second conductive part. The second diaphragm layer is provided with a plurality of leaks to expose the first conductive part and the second conductive part.

Further, the first diaphragm layer includes a first fixing part, a first connecting part, a second fixing part and a first bearing part; the first connecting part connects the first fixing part and the second fixing part; the first bearing part is connected to the second fixing part and located one side away from the first fixing part; the second diaphragm layer includes a second bearing part, a second connecting part, a third fixing part and a third bearing part; the second connecting part connects the second bearing part and the third fixing part; the third bearing part is connected to the third fixing part and located one side away from the second bearing part; the second bearing part coincidently covers at least part of a region of the first fixing part; the second connecting part coincidently covers the first connecting part; the third fixing part coincidently covers the second fixing part; and the third bearing part coincidently covers at least part of a region of the first bearing part.

Further, the first conductive part is arranged between the first fixing part and the second bearing part; the first supporting part is arranged between the first connecting part and the second connecting part; and the second conductive part is arranged between the first bearing part and the third bearing part.

Further, the second bearing part is provided with a first leak to expose the first conductive part, and the third bearing part is provided with a second leak to expose the second conductive part.

Further, the first connecting part has an annular structure, the first fixing part extends inwards from an inner edge of the first connecting part, the second fixing part extends outwards from an outer edge of the first connecting part, and the first bearing part extends outwards from part of a region of an outer edge of the second fixing part; and the second connecting part has an annular structure, the second bearing part extends inwards from part of a region of an inner edge of the second connecting part, the third fixing part extends outwards from an outer edge of the second connecting part, and the third bearing part extends outwards from part of a region of an outer edge of the third fixing part.

Further, the first supporting part has a slender curved sheet structure.

According to a second aspect, embodiments of the disclosure further provide a loudspeaker. The loudspeaker includes: a bracket; a first magnetic circuit system, arranged on the bracket and suitable for forming a magnetic gap region; and a first vibrating system, including a first voice coil and the vibrating diaphragm according to the first aspect, where the diaphragm is connected to the bracket, the first conductive part is connected to a lead of the first voice coil, and the first voice coil is arranged in the magnetic gap region formed by the first magnetic circuit system to drive the vibrating diaphragm to vibrate.

Further, an accommodating groove is formed in the bracket; and the vibrating diaphragm is arranged on the bracket through the accommodating groove.

Further, an accommodating channel is formed at a groove bottom of the accommodating groove. The loudspeaker further includes: a terminal. The terminal is arranged in the accommodating channel, and one end of the terminal is connected to the second conductive part.

Further, the terminal is set as a U-shaped channel; and the accommodating channel is set as a U-shaped channel.

Embodiments of the disclosure provide a vibrating diaphragm and a loudspeaker. The vibrating diaphragm includes a first diaphragm layer, a first conductive metal layer and a second diaphragm layer which are stacked sequentially. The first conductive metal layer includes two metal foils. Each of the metal foils includes a first conductive part, a second conductive part, and a first supporting part arranged between the first conductive part and the second conductive part. The second diaphragm layer is provided with a plurality of leaks to expose the first conductive part and the second conductive part. Therefore, the metal foils are integrated between the first diaphragm layer and the second diaphragm layer, so that the space occupied by the metal foils may be reduced to simplify the conduction design of the loudspeaker, and the metal foils may be protected to avoid the breakage of the metal foils.

BRIEF DESCRIPTION OF THE DRAWINGS

The above and other purposes, features, and advantages of the disclosure will be more apparent from the following description of the embodiments of the disclosure with reference to the accompanying drawings. In the drawings.

DETAILED DESCRIPTION OF EMBODIMENTS OF THE INVENTION

Figure 1:
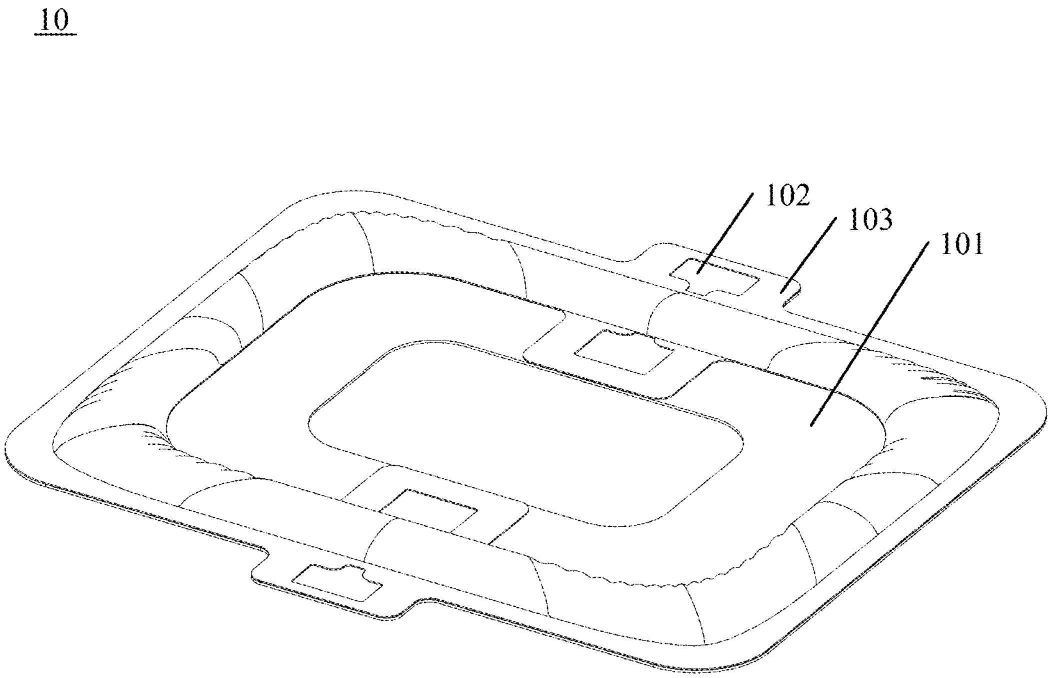
FIG. 1 is a schematic structural diagram of a vibrating diaphragm according to a first embodiment of the disclosure.

The present application is described below based on embodiments, but the present application is not only limited to these embodiments. In the following detailed description of the present application, some specific details are described in detail. The present application can also be fully understood by those skilled in the art without the description of these details. To avoid confusing the essence of the present application, well-known methods, processes, flows, elements and circuits are not described in detail.

In addition, those of ordinary skill in the art should be understood that the drawings provided herein are for illustrative purposes, and the drawings are not necessarily drawn to scale.

Unless otherwise specified and limited, the terms "mounted", "connected", "connection", "fixed", and the like should be understood broadly. For example, the "connection" may be a fixed connection, a detachable connection, or an integrated connection, may be a mechanical connection or an electrical connection, may be a direct connection or an indirect connection by means of an intermediate medium, or may be an internal connection of two elements or an interaction between two elements. For those of ordinary skill in the art, the specific meaning of the terms in the present application may be understood according to specific situations.

For ease of description, the spatially relative terms such as "in", "out", "under", "below", "lower", "above", "upper", etc., are used to describe a relationship between one element or feature and another element or feature shown in the figures herein. It should be understood that the spatially relative terms desire to include different orientations in addition to orientations described in the figures when a device is used or operated. For example, if the device in the figures is flipped, it is described that elements "below" or "under" other elements or features are positioned to be "above" other elements or features. Therefore, exemplary terms "below" can include both orientations of "above" and "below". The device may be oriented in other manners (rotated 90 degree or at other orientations) and the spatially relative descriptors used herein may be interpreted accordingly.

Unless the context clearly requires otherwise, similar words such as "including" and "containing" throughout the application document should be interpreted as inclusive rather than exclusive or exhaustive; that is to say, it means "including but not limited to".

In the description of the present application, it needs to be understood that the terms "first", "second" and the like are merely used for descriptive purposes, and cannot be understood as indicating or implying relative importance. Moreover, in the description of the present application, unless otherwise stated, "a plurality of" means two or more.

Embodiments of the disclosure provide a vibrating element for a loudspeaker. The vibrating element is a sheet-like elastic piece connected to a voice coil of the loudspeaker and may vibrate along with the reciprocating motion of the voice coil. The circuit conduction design of the loudspeaker may be optimized through the vibrating element. Specifically, the vibrating element includes a first elastomer layer, a conductive layer and a second elastomer layer which are stacked sequentially. That is, the first elastomer layer and the second elastomer layer coat the conductive layer from two directions, that is, the conductive layer is integrated between the first elastomer layer and the second elastomer layer. Further, the conductive layer includes two conductive parts, and a supporting structure between the two conductive parts. It should be noted that the two conductive parts may be exposed from an avoidance structure on the second elastomer layer so as to be electrically connected to an external circuit and a voice coil. It should be further noted that the conductive layer includes a conductive metal sheet which is integrally stamped and formed. Exemplarily, the vibrating element provided by the embodiments of the disclosure is a vibrating diaphragm or a damper.

Figure 2:
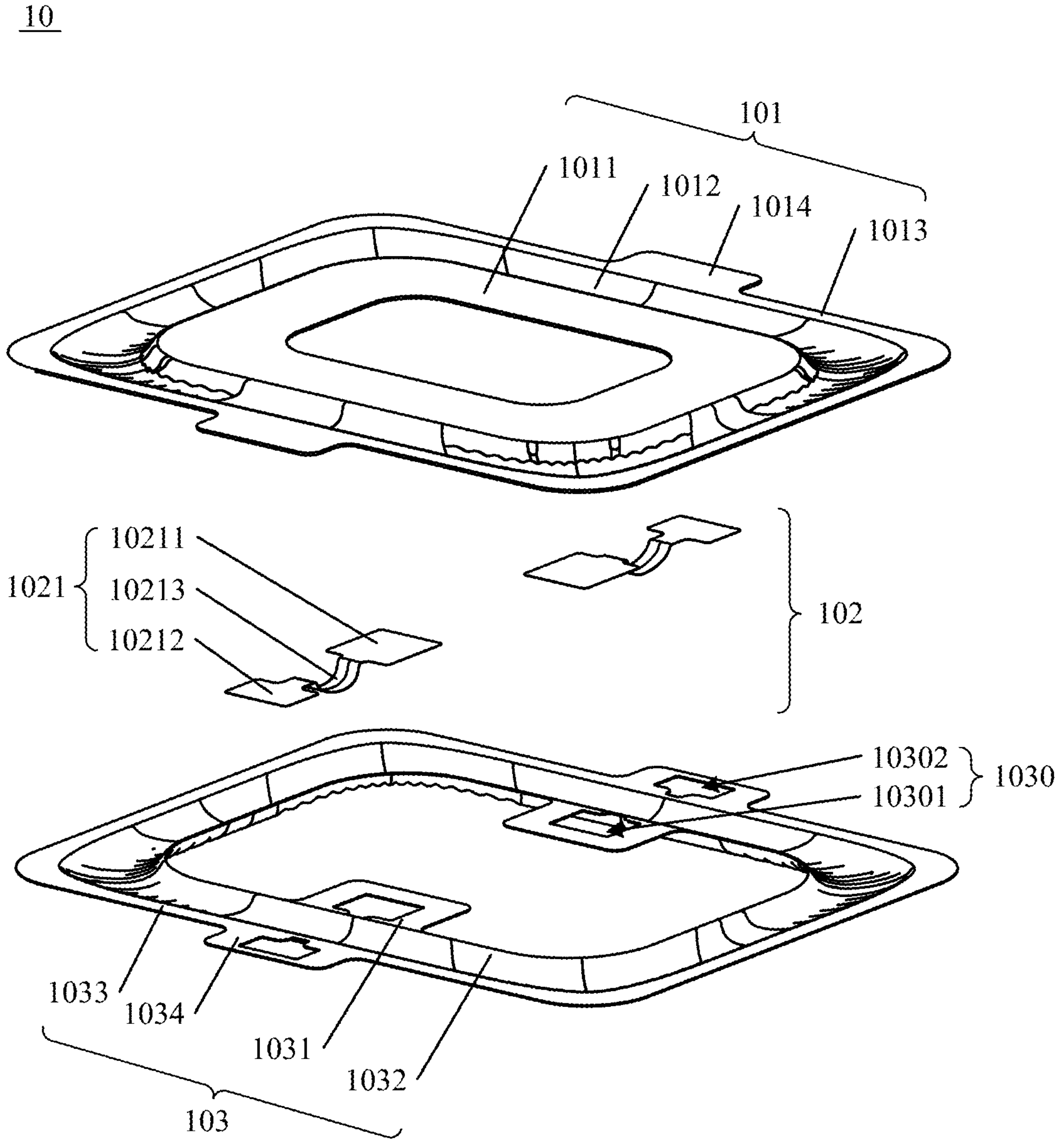
FIG. 2 is a schematic exploded view of a vibrating diaphragm according to a first embodiment of the disclosure.

FIG. 1 is a schematic structural diagram of a vibrating diaphragm according to a first embodiment of the disclosure; and FIG. 2 is a schematic exploded view of a vibrating diaphragm according to a first embodiment of the disclosure. Referring to FIG. 1 and FIG. 2, the vibrating diaphragm 10 in the first embodiment, that is, the vibrating element includes a first diaphragm layer 101, a first conductive metal layer 102 and a second diaphragm layer 103 which are stacked sequentially. The first diaphragm layer 101 and the second diaphragm layer 103 have sheet structures. The first conductive metal layer 102 includes two metal foils 1021, and the two metal foils 1021 are located on two opposite sides of the vibrating diaphragm 10, respectively. Further, each of the metal foils 1021 includes a first conductive part 10211 a second conductive part 10212, and a first supporting part 10213 arranged between the first conductive part 10211 and the second conductive part 10212. Further, the second diaphragm layer 103 is provided with a plurality of leaks 1030, and the first conductive part 10211 and the second conductive part 10212 may be exposed through the plurality of leaks 1030, so that the loudspeaker may be connected to an external circuit. Therefore, the metal foils 1021 are integrated between the first diaphragm layer 101 the second diaphragm layer 103, so that the space occupied by the metal foils 1021 may be reduced to simplify the conduction design of the loudspeaker, and the metal foils 1021 may be protected to avoid the breakage of the metal foils 1021. It should be noted that the vibrating diaphragm 10 in this embodiment is rectangular. As an optional implementation, the vibrating diaphragm 10 may be set as a circular shape or other shapes.

As shown in FIG. 2, in one implementation, the first diaphragm layer 101 includes a first fixing part 1011, a first connecting part 1012, a second fixing part 1013 and a first bearing part 1014 sequentially from inside to outside. The first connecting part 1012 is connected to the first fixing part 1011 and the second fixing part 1013, and the first bearing part 1014 is connected to the second fixing part 1013 and located on one side away from the first fixing part 1011. It should be noted that the first connecting part 1012 is set as a curved surface structure and is provided with a reinforcing rib, the first fixing part 1011 is set as a plane structure to be connected to a middle patch 15, a center through hole is surrounded by the first fixing part 1011, the second fixing part 1013 is set as a plane structure to be connected to a bracket 11, and the first bearing part 1014 is set as a plane structure. It is easily understood that the middle patch 15 may provide rigidity for the vibrating diaphragm 10 to do piston type translation. In this implementation, the second diaphragm layer 103 includes a second bearing part 1031, a second connecting part 1032, a third fixing part 1033 and a third bearing part 1034 sequentially from inside to outside. The second connecting part 1032 is connected to the second bearing part 1031 and the third fixing part 1033, and the third bearing part 1034 is connected to the third fixing part 1033 and located on one side away from the second bearing part 1031. It should be noted that the second connecting part 1032 is set as a curved surface structure and provided with a reinforcing rib, the second bearing part 1031 part is set as a plane structure corresponding to the first fixing part 1011, the third fixing part 1033 is set as a plane structure corresponding to the second fixing part 1013, and the third bearing part 1034 is set as a plane structure corresponding to the first bearing part 1014. Further, the second bearing part 1031 coincidently covers at least part of a region of the first fixing part 1011, the second connecting part 1032 coincidently covers the first connecting part 1012, the third fixing part 1033 coincidently covers the second fixing part 1013, and the third bearing part 1034 coincidently covers at least part of a region of the first bearing part 1014. Therefore, the first diaphragm layer 101 may cooperate with the second diaphragm layer 103 to coat the first conductive metal layer 102.

As shown in FIG. 2, in one implementation, the first connecting part 1012 has an annular structure, the first fixing part 1011 extends inwards from an inner edge of the first connecting part 1012, the second fixing part 1013 extends outwards from an outer edge of the first connecting part 1012, and the first bearing part 1014 extends outwards from part of a region of an outer edge of the second fixing part 1013. That is, the first fixing part 1011 is set as an annular plane structure on an inner side of the first connecting part 1012, so that the vibrating diaphragm 10 is tightly connected to the middle patch 15; the second fixing part 1013 is set as an annular plane structure on an outer side of the first connecting part 1012, so that the vibrating diaphragm 10 is tightly connected to the bracket 11; and the first bearing part 1014 is set as a convex plane structure on an outer side of the second fixing part 1013 so as to be matched with the second conductive part 10212. Correspondingly, the second connecting part 1032 has an annular structure, the second bearing part 1031 extends inwards from part of a region of an inner edge of the second connecting part 1032, the third fixing part 1033 extends outwards from an outer edge of the second connecting part 1032, and the third bearing part 1034 extends outwards from part of a region of an outer edge of the third fixing part 1033. That is, the second bearing part 1031 is set as a convex planar structure on an inner side of the second connecting part 1032 so as to be matched with the first conductive part 10211; the third fixing part 1033 is set as an annular plane structure on an outer side of the second connecting part 1032, so that the vibrating diaphragm 10 is tightly connected to the bracket 11; and the third bearing part 1034 is set as a convex plane structure on an outer side of the third fixing part 1033 so as to be matched with the second conductive part 10212.

Referring to FIG. 2, in one implementation, the structure of the first conductive metal layer 102 is matched with the first diaphragm layer 101 and the second diaphragm layer 103 mutually. Specifically, the first conductive part 10211 is set as a plane structure and arranged between the first fixing part 1011 and the second bearing part 1031; the first supporting part 10213 is set as a curved surface structure and arranged between the first connecting part 1012 and the second connecting part 1032; and the second conductive part 10212 is set as a plane structure and arranged between the first bearing part 1014 and the third bearing part 1034.

As shown in FIG. 2, in one implementation, a plurality of leaks 1030 include a first leak 10301 and a second leak 10302. Specifically, the first leak 10301 is formed on the second bearing part 1031, so that the first conductive part 10211 is exposed through the first leak 10301 and electrically connected to a first voice coil 131. Correspondingly, the second leak 10302 is formed on the third bearing part 1034, so that the second conductive part 10212 is exposed through the second leak 10302 and electrically connected to an external circuit.

Referring to FIG. 2, in one implementation, the first supporting part 10213 has a slender curved surface sheet structure, that is, an extremely narrow slender curved sheet structure (a width is far less than a length or an arc length), which may avoid the influence on the overall elasticity of the vibrating diaphragm 10 due to high rigidity caused by the excessively wide first supporting part 10213, thereby reducing the influence on the performance such as resonance of the loudspeaker. A width of the first conductive part 10211 and a width of the second conductive part 10212 are greater than a width of the first supporting part 10213, and the first conductive part 10211 and the second conductive part 10212 have large area so as to be welded with a lead of the first voice coil 131 and the external circuit stably.

It should be noted that in one implementation, the metal foil 1021 has an integrated structure which is formed through integrated stamping or machining, thereby improving the conductivity of the metal foil 1021, simplifying the processing process and the reducing the cost.

It should be noted that in one implementation, the first diaphragm layer 101 may be made of polyether-ether-ketone (PEEK) with entrainment damping, and the second diaphragm layer 103 may be made of PEEK and polyurethane (PU). Further, the metal foil 1021 may be a copper foil, an aluminum foil, a tin foil and other conductive materials, and has high conductivity and flexibility.

Figure 3:
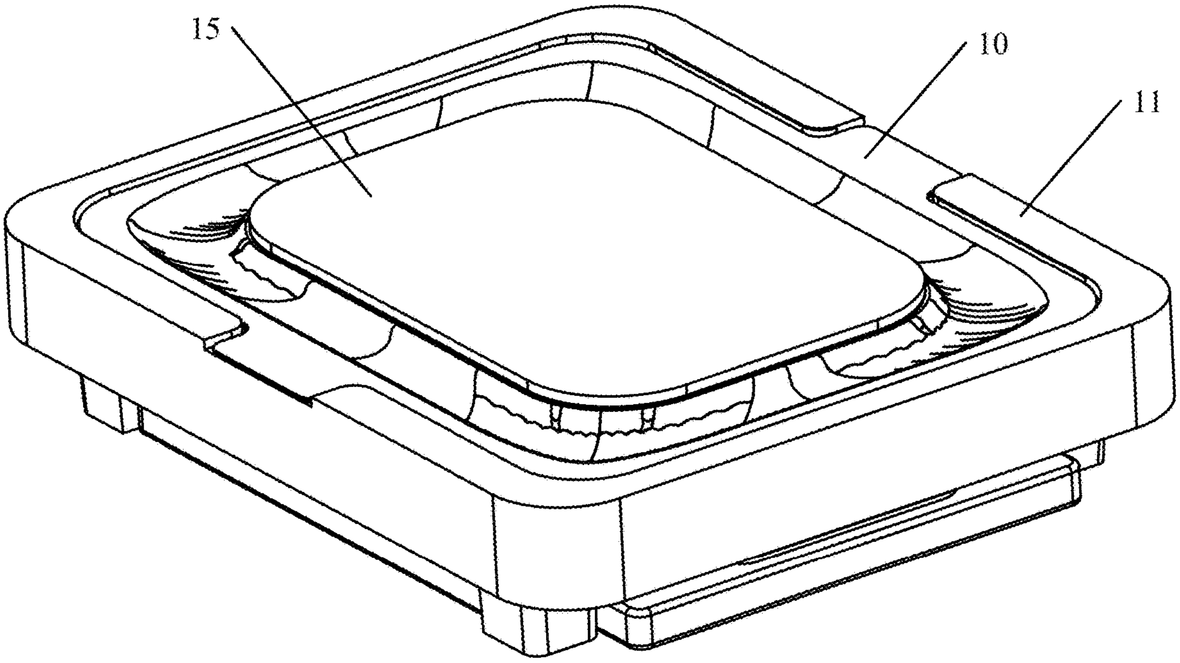
FIG. 3 is a schematic structural diagram of a loudspeaker according to a first embodiment of the disclosure.
Figure 4:
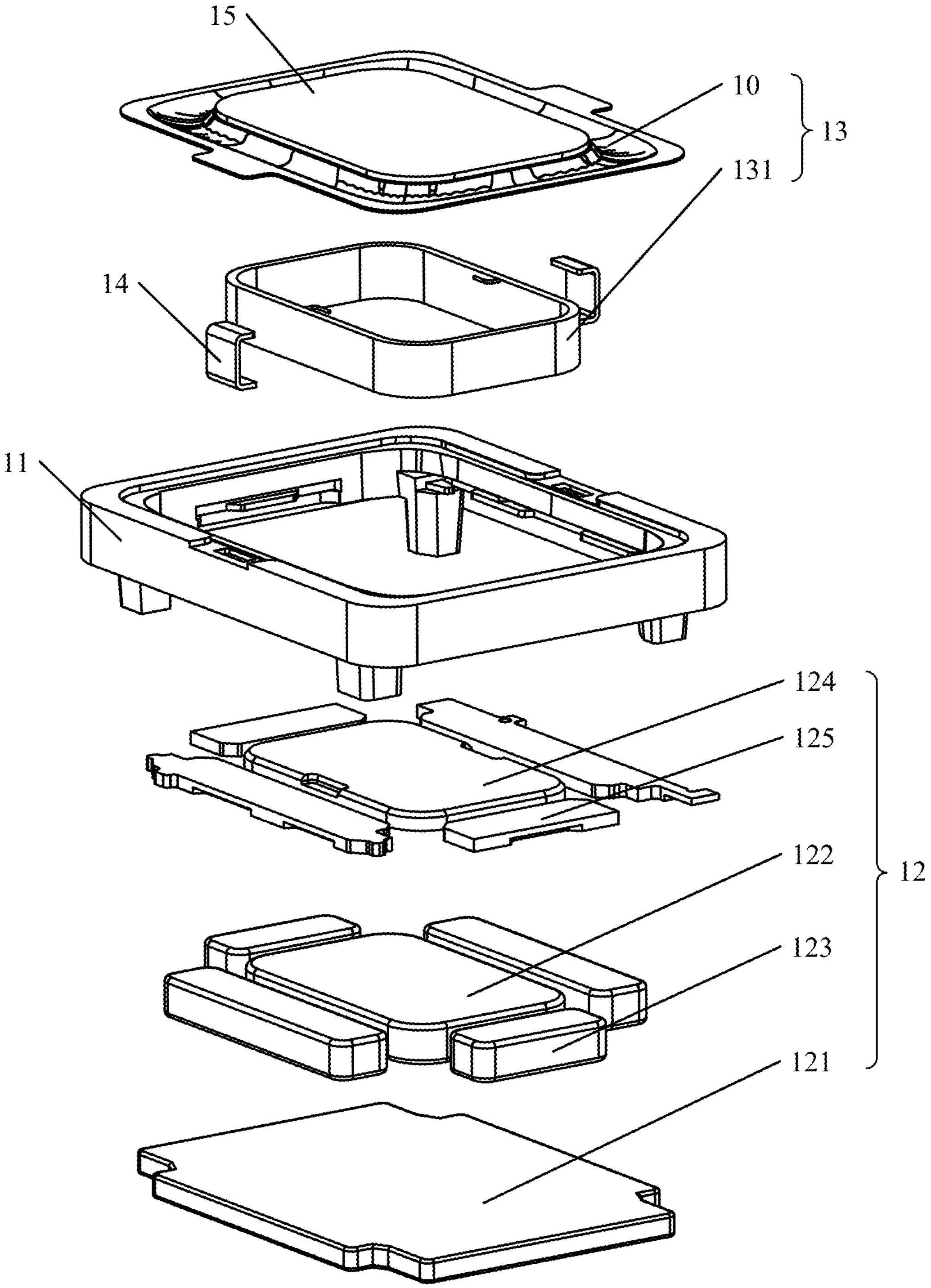
FIG. 4 is a schematic exploded view of a loudspeaker according to a first embodiment of the disclosure.

FIG. 3 is a schematic structural diagram of a loudspeaker according to a first embodiment of the disclosure; and FIG. 4 is a schematic exploded view of a loudspeaker according to a first embodiment of the disclosure. Referring to FIG. 3 and FIG. 4, the loudspeaker in the first embodiment includes a bracket 11, a first magnetic circuit system 12 and a first vibrating system 13. The first magnetic circuit system 12 is arranged on the bracket 11 and suitable for a magnetic gap region. Further, the first vibrating system 13 includes a first voice coil 131 and a vibrating diaphragm 10. It is easily understood that the structure of the vibrating diaphragm 10 is as described above, which will not be elaborated herein. Further, the vibrating diaphragm 10 is connected to the bracket 11, the first conductive part 10211 is connected to the lead of the first voice coil 131, and the first voice coil 131 is arranged in the magnetic gap region formed by the first magnetic circuit system 12 to drive the vibrating diaphragm 10 to vibrate. Therefore, through the arrangement of the vibrating diaphragm 10, the space occupied by the metal foils 1021 may be reduced to simplify the conduction design of the loudspeaker, and the metal foils 1021 may be protected to avoid the breakage of the metal foils 1021.

Figure 5:
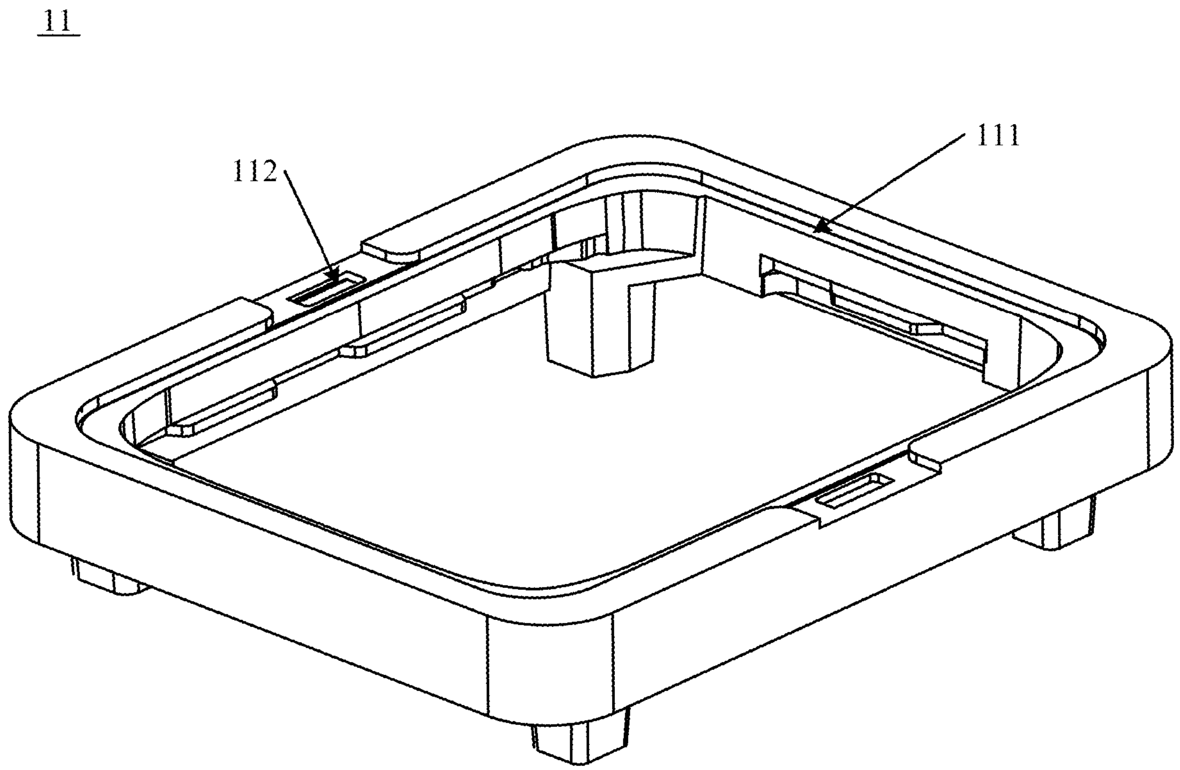
FIG. 5 is a schematic structural diagram of a bracket according to a first embodiment of the disclosure.

FIG. 5 is a schematic structural diagram of a bracket according to a first embodiment of the disclosure. Referring to FIG. 5, in one implementation, an accommodating groove 111 is formed in the bracket 11, and the vibrating diaphragm 10 is arranged on the bracket 11 through the accommodating groove 111. Specifically, the structure of the accommodating groove 111 is matched with the second fixing part 1013 and the first bearing part 1014 mutually, that is, the structure of the accommodating groove 111 is matched with the third fixing part 1033 and the third bearing part 1034 mutually. Therefore, the vibrating diaphragm 10 may be embedded into the accommodating groove 111 to be tightly connected to the bracket 11.

As shown in FIG. 5, in one implementation, an accommodating channel 112 is formed at a groove bottom of the accommodating groove 111. It is easily understood that the position of the accommodating channel 112 is matched with the first bearing part 1014 and the third bearing part 1034 mutually. Further, as shown in FIG. 4, the loudspeaker further includes a terminal 14, and the terminal 14 is arranged in the accommodating channel 112. It is easily understood that an upper end of the terminal 14 is exposed from an upper opening of the accommodating channel 112 to be connected to the second conductive part 10212, and a lower end of the terminal 14 is exposed from a lower opening of the accommodating channel 112 to be connected to the external circuit. Therefore, corresponding to the connection between the first conductive part 10211 and the lead of the first voice coil 131, the first voice coil 131 may be electrically connected to the external circuit through the first conductive metal layer 102 of the vibrating diaphragm 10 and the terminal 14. Specifically, two first conductive parts 10211 are electrically connected to two leads of the first voice coil 131, respectively; and two second conductive parts 10212 are electrically connected to an incoming terminal and an outgoing terminal of the external circuit, respectively.

Figure 6:
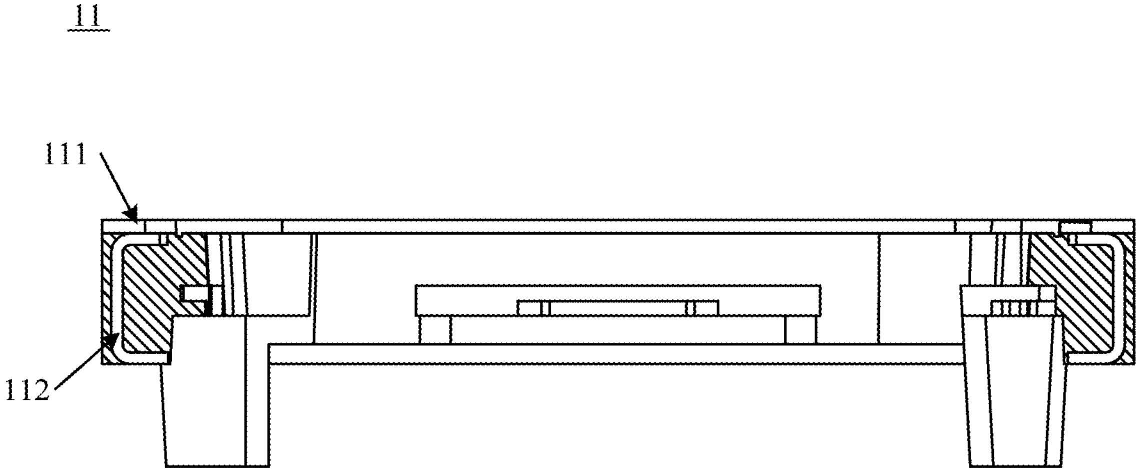
FIG. 6 is a schematic sectional view of a bracket according to a first embodiment of the disclosure.

FIG. 6 is a schematic sectional view of a bracket according to a first embodiment of the disclosure. Referring to FIG. 4 and FIG. 6, the terminal 14 is set as a U-shaped structure, and the accommodating channel 112 is correspondingly set as a U-shaped channel. Therefore, when the terminal 14 is arranged in the accommodating channel 112, the terminal 14 may be ensured not to fall out of the accommodating channel 112, the exposed area of the terminal 14 may be enlarged, the contact area of the terminal 14, the metal foil 1021 and the external circuit may be enlarged, and poor contact may be avoided.

As shown in FIG. 4, in one implementation, the first magnetic circuit system 12 includes a magnetic bowl 121, a first main magnetic steel 122, a first secondary magnetic steel 123, a main pole piece 124 and a secondary pole piece 125. Specifically, supporting legs are arranged at the bottom of the bracket 11, and the magnetic bowl 121 is fixedly connected to the bracket 11 through the supporting legs. Further, the first main magnetic steel 122 and the first secondary magnetic steel 123 are arranged above the magnetic bowl 121, and the first secondary magnetic steel 123 surrounds the first main magnetic steel 122. A certain gap is formed between the first secondary magnetic steel 123 and the first main magnetic steel 122, thereby facilitating the arrangement of the first voice coil 131. Further, the main pole piece 124 is arranged above the first main magnetic steel 122, and the secondary pole piece 125 is arranged above the first secondary magnetic steel 123. It should be noted that a concave-convex mounting structure is arranged on an inner side wall of the bracket 11, thereby facilitating the mounting of the secondary pole piece 125.

The first embodiment of the disclosure provides a vibrating diaphragm 10 and a loudspeaker. The vibrating diaphragm 10 includes a first diaphragm layer 101, a first conductive metal layer 102 and a second diaphragm layer 103 which are stacked sequentially. The first conductive metal layer 102 includes two metal foils 1021. Each of the metal foils 1021 includes a first conductive part 10211, a second conductive part 10212, and a first supporting part 10213 arranged between the first conductive part 10211 and the second conductive part 10212. The second diaphragm layer 103 is provided with a plurality of leaks 1030 to expose the first conductive part 10211 and the second conductive part 10212. Therefore, the metal foils 1021 are integrated between the first diaphragm layer 101 the second diaphragm layer 103, so that the space occupied by the metal foils 1021 may be reduced to simplify the conduction design of the loudspeaker, and the metal foils 1021 may be protected to avoid the breakage of the metal foils 1021. On the other hand, through the arrangement of the vibrating diaphragm 10, the loudspeaker has enough space to add the first secondary magnetic steel 123, which is helpful to improve the acoustic performance of the loudspeaker.

Figure 7:
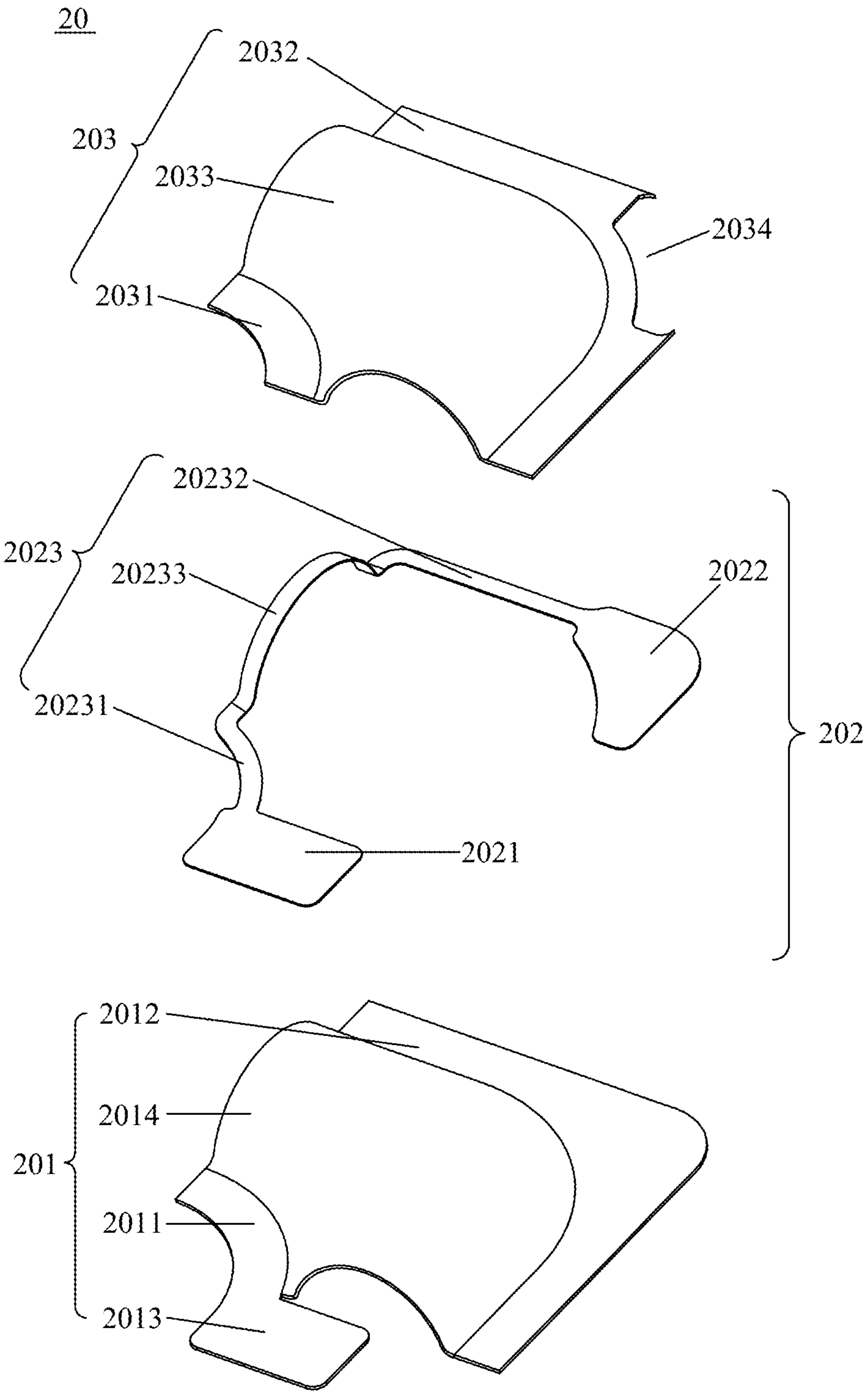
FIG. 7 is a schematic exploded view of a damper according to a second embodiment of the disclosure.
Figure 8:
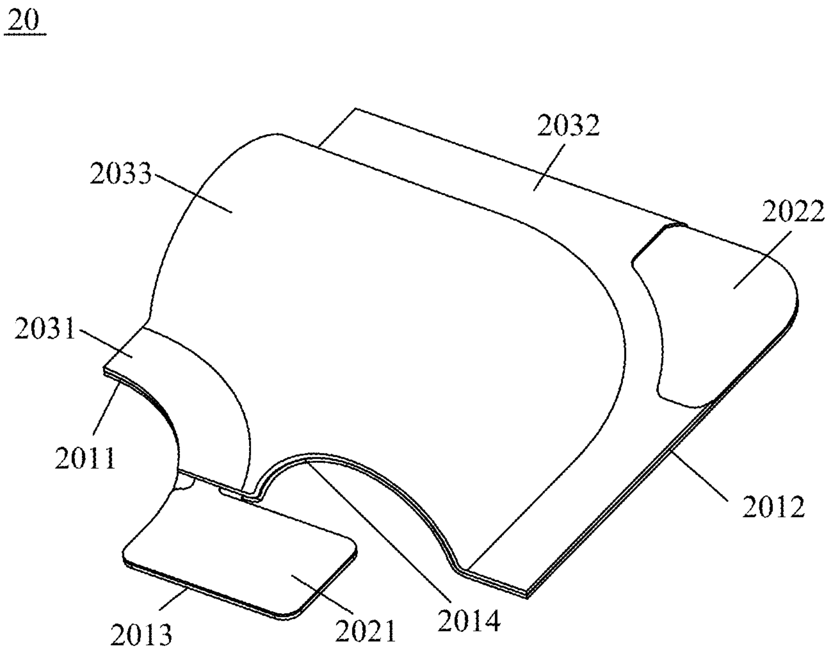
FIG. 8 is a schematic structural diagram of a damper according to a second embodiment of the disclosure.

FIG. 7 is a schematic exploded view of a damper according to a second embodiment of the disclosure; and FIG. 8 is a schematic structural diagram of a damper according to a second embodiment of the disclosure. Referring to FIG. 7 and FIG. 8, the damper 20 in the second embodiment includes a first damper sheet layer 201, a second conductive metal layer 202 and a second damper sheet layer 203, and the first damper sheet layer 201, the second conductive metal layer 202 and the second damper sheet layer 203 are stacked sequentially from bottom to top, as shown in FIG. 7 and FIG. 8. After the damper 20 is fixed on the basin frame 21 and a second voice coil 222 of the loudspeaker, two ends of the second conductive metal layer 202 are configured to be connected to a lead of the second voice coil 222 and an external circuit, so that the second voice coil 222 and the external circuit are conducted. The damper 20 has the effect of inhibiting the swinging motion and the circuit conduction of the second voice coil 222, and a flexible printed circuit board in the original structure is canceled, so that the loudspeaker is simple in structure, simple in manufacturing process assembling and low in cost.

Specifically, the second conductive metal layer 202 includes a third conductive part 2021, a fourth conductive part 2022 and a second supporting part 2023, and the second supporting part 2023 is connected to the third conductive part 2021 and the fourth conductive part 2022, as shown in FIG. 7. The third conductive part 2021 is configured to be electrically connected to the lead of the second voice coil

222, and the fourth conductive part 2022 is configured to be electrically connected to an incoming end or an outgoing end of the external circuit, so that the circuit is conducted to generate a corresponding magnetic field to work.

The second supporting part 2023 is arranged between the first damper sheet layer 201 and the second damper sheet layer 203 in an attaching manner. The second supporting part 2023 is set as a curved shape (that is, having the same radian) adapted to surfaces of the first damper sheet layer 201 and the second damper sheet layer 203, so that when the loudspeaker works, the second conductive metal layer 202 may float along with the up-and-down vibration of the first damper sheet layer 201 and the second damper sheet layer 203, short circuit caused by breakage in the vibrating process may be avoided, and the service life of the loudspeaker may be prolonged.

Further, the second supporting part 2023 has a slender curved surface sheet structure, that is, an extremely narrow slender curved sheet structure (a width is far less than a length or an arc length), which may avoid the influence on the overall elasticity of the damper 20 due to high rigidity caused by the excessively wide second supporting part 2023, thereby reducing the influence on the performance such as resonance of the loudspeaker. A width of the third conductive part 2021 and a width of the fourth conductive part 2022 are greater than a width of the second supporting part 2023, and the third conductive part 2021 and the fourth conductive part 2022 have large area so as to be welded with a lead of the second voice coil and the external circuit stably.

Figure 10:
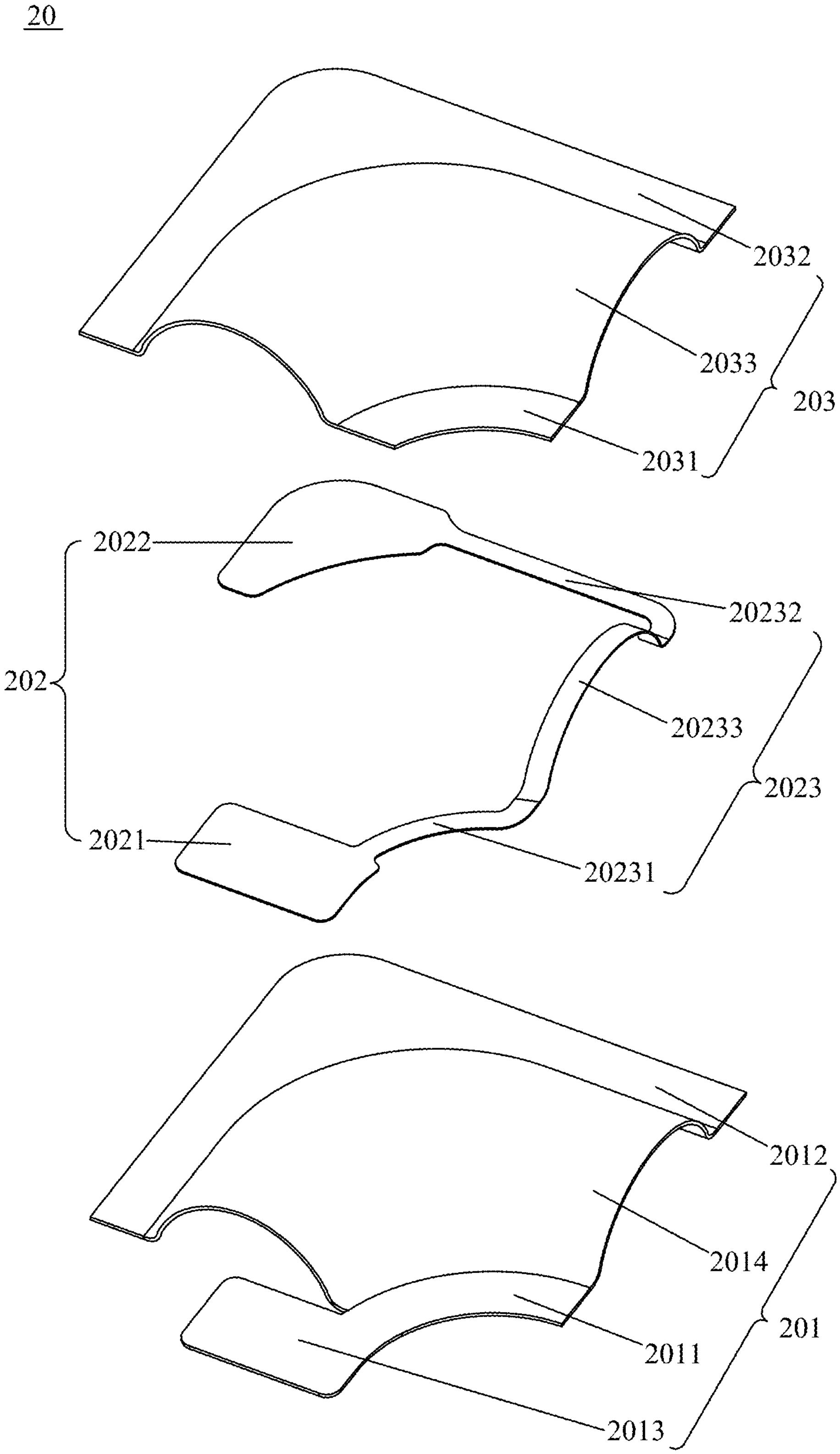
FIG. 10 is a schematic exploded view of another damper according to a second embodiment of the disclosure.

The second supporting part 2023 includes a first connecting section 20231, a second connecting section 20232 and a curve connecting section 20233, the curve connecting section 20233 is connected to the first connecting section 20231 and the second connecting section 20232, the first connecting section 20231 is connected to the third conductive part 2021, and the second connecting section 20232 is connected to the fourth conductive part 2022, as shown in FIG. 7 and FIG. 10. The first connecting section 20231 and the second connecting section 20232 have slender plane structures, and may be attached to an inner edge and an outer edge of the first damper sheet layer 201, respectively, thereby facilitating communication with the lead of the second voice coil and the external circuit. The curve connecting section 20233 has an extremely narrow or slender curved surface structure adapted to curved surfaces of the first damper sheet layer 201 and the second damper sheet layer 203, so that the damper 20 may meet the conductivity and may meet the elasticity requirement. The curve connecting section 20233 is curved along a middle curved surface and extends from an inner edge of the first damper sheet layer 201 to an outer edge.

In one implementation, the third conductive part 2021 and the fourth conductive part 2022 are located on the same side, the first connecting section 20231 and the second connecting section 20232 are connected to two ends of the curve connecting section 20233 and extend towards the third conductive part 2021 and the fourth conductive part 2022 respectively for connection. Therefore, the second supporting part 2023 and the second conductive metal layer 202 form C-shaped structures.

In one implementation, the second conductive metal layer 202 may be a copper foil, an aluminum foil, a tin foil and other conductive materials, and has good conductivity and flexibility.

In one implementation, the second conductive metal layer 202 may be an integrated structure formed through integrated stamping or machining, thereby improving the conductivity of the second conductive metal layer 202, simplifying the processing process and reducing the cost.

The structures of the first damper sheet layer 201 and the second damper sheet layer 203 in the damper 20 may prevent the second voice coil 222 from touching an iron sheet or a magnet when moving in the magnetic gap, or may keep the second voice coil 222 at a center position, thereby improving the performance of the loudspeaker.

As shown in FIG. 7 and FIG. 10, the first damper sheet layer 201 includes a fourth fixing part 2011, a fifth fixing part 2012, a fourth bearing part 2013 and a first curved surface connecting part 2014; the first curved surface connecting part 2014 is connected to the fourth fixing part 2011 and the fifth fixing part 2012; and the fourth bearing part 2013 is connected to the fourth fixing part 2011 and extends to an outer side of the first curved surface connecting part 2014.

The first connecting section 20231 of the second conductive metal layer 202 is arranged on the fourth fixing part 2011, the fourth conductive part 2022 and the second connecting section 20232 are arranged on the fifth fixing part 2012, the curve connecting section 20233 is arranged on the first curved surface connecting part 2014, and the third conductive part 2021 is arranged on the fourth bearing part 2013. The fourth fixing part 2011 is configured to be connected to the second voice coil 222, and the fifth fixing part 2012 is configured to be connected to the basin frame 21, so that the third conductive part 2021 may be electrically connected to the lead of the second voice coil 222, and the fourth conductive part 2022 may be connected to the external circuit. The first curved surface connecting part 2014 is located between the basin frame 21 and the second voice coil 222, has high elasticity, and may keep the second voice coil 222 at the position of the magnetic gap along with the vertical up-and-down motion of the second voice coil 222, thereby preventing from touching the magnet or the magnetic steel during motion.

In one implementation, since the damper 20 is connected to the corner positions of the second voice coil 222 and the basin frame 21, to improve the connection stability of the damper 20, the second voice coil 222 and the basin frame 21, the fourth fixing part 2011 is set as a fan-ring-shaped sheet structure with the same width and the same corner shape as those of the second voice coil, and the fifth fixing part 2012 is set as a shape with the same width and the same corner shape as those of the basin frame 21, as shown in FIG. 7. The shapes of the fourth fixing part 2011 and the fifth fixing part 2012 may increase the connecting area with the second voice coil 222 and the basin frame 21, thereby enhancing the strength of the damper 20 and improving the performance.

The first connecting section 20231 is set as an extremely narrow fan-ring-shaped sheet structure with the same radian as that of the fourth fixing part 2011, and the second connecting section 20232 is set as an extremely narrow sheet structure with the same radian as that of the fifth fixing part 2012 so as to be completely arranged on the fourth fixing part 2011 and the fifth fixing part 2012, thereby preventing the exposure therebetween. The curve connecting section 20233 is set as an extremely narrow arc-shaped sheet structure with the same curvature or radian as that of the first curved surface connecting part 2014 (that is, the curve connecting section 20233 has the same cross-sectional shape as that of the first curved surface connecting part 2014), so that the curve connecting section 20233 may be completely attached to the first curved surface connecting part 2014 to move along with the first curved surface connecting part 2014.

As shown in FIG. 7 and FIG. 10, the second damper sheet layer 203 includes a sixth fixing part 2031, a seventh fixing part 2032 and a second curved surface connecting part 2033, and the second curved surface connecting part 2033 is connected to the sixth fixing part 2031 and the seventh fixing part 2032. The second damper sheet layer 203 is connected to an upper part of the first damper sheet layer 201 to cover the second conductive metal layer 202, as shown in FIG. 8 and FIG. 9.

In one implementation, the shape of the sixth fixing part 2031 is the same as that of the fourth fixing part 2011, the shape of the seventh fixing part 2032 is the same as that of the fifth fixing part 2012, and the shape of the second curved surface connecting part 2033 is the same as that of the first curved surface connecting part 2014, as shown in FIG. 10. When the second damper sheet layer 203 is connected to an upper part of the first damper sheet layer 201, the sixth fixing part 2031 coincidently covers the fourth fixing part 2011, the seventh fixing part 2032 coincidently covers the fifth fixing part 2012, the second curved surface connecting part 2033 coincidently covers the first curved surface connecting part 2014, and the fourth bearing part 2013 extends to outer sides of the first curved surface connecting part 2014 and the second curved surface connecting part 2033. That is, the outer counter of the first damper sheet layer 201 is adapted to the outer counter of the second damper sheet layer 203, and the second conductive metal layer 202 is arranged between the first damper sheet layer 201 and the second damper sheet layer 203, so that the performance and the appearance of the damper 20 may be improved.

Figure 9:
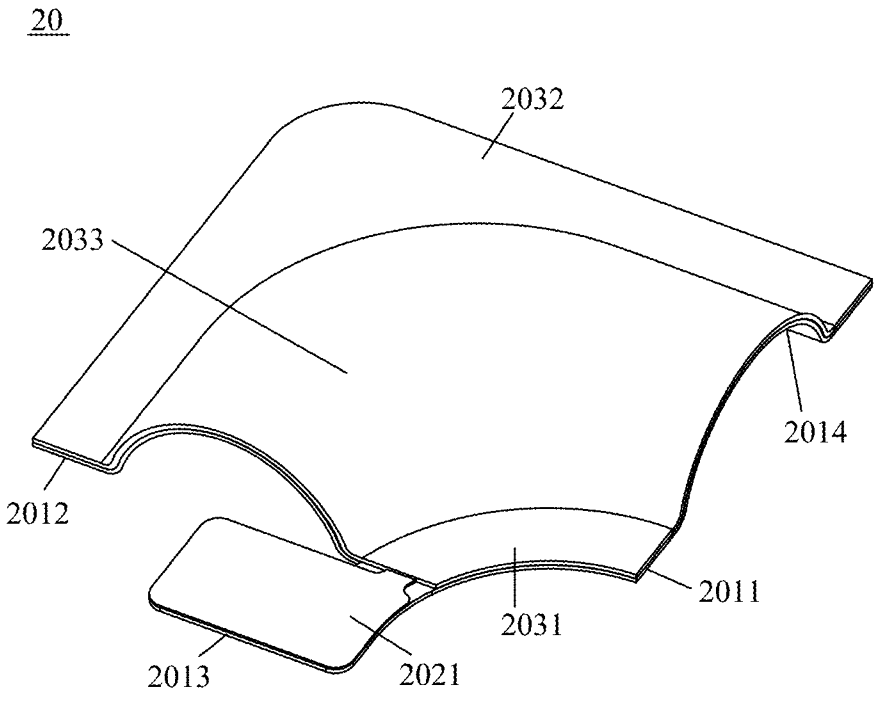
FIG. 9 is a schematic structural diagram of another damper according to a second embodiment of the disclosure.

The first connecting section 20231 is arranged between the fourth fixing part 2011 and the sixth fixing part 2031, the fourth conductive part 2022 and the second connecting section 20232 are arranged between the fifth fixing part 2012 and the seventh fixing part 2032, the curve connecting section 20233 is arranged between the first curved surface connecting part 2014 and the second curved surface connecting part 2033, and the third conductive part 2021 is arranged on the fourth bearing part 2013, as shown in FIG. 9. Since the fourth conductive part 2022 is completely covered with the seventh fixing part 2032, the damper 20 cannot communicate with the external circuit, which only plays a role in inhibiting the swinging motion of the second voice coil 222 and controlling the position of the second voice coil.

In another implementation, the seventh fixing part 2032 has a notch 2034. In a case that the third conductive part 2021 and the fourth conductive part 2022 of the second conductive metal layer 202 are required to be electrically connected to the lead of the second voice coil 222 and the external circuit, as shown in FIG. 7, the fourth conductive part 2022 may be exposed from the notch 2034 so as to be electrically connected to the external circuit. The damper 20 has the effect of inhibiting the swinging motion and the circuit conduction of the second voice coil 222. The fourth conductive part 2022 is attached to the fifth fixing part 2012 corresponding to the notch 2034. At least one part of the fourth bearing part 2013 coincides with the third conductive part 2021, and at least one part of the notch 2034 coincides with the fourth conductive part 2022, so that the third conductive part 2021 and the fourth conductive part 2022 may be exposed conveniently to be electrically connected to the lead of the second voice coil 222 and the external circuit, respectively.

In an optional implementation, the shape of the notch 2034 is the same as that of the fourth conductive part 2022, and the shape of an upper surface of the fourth bearing part 2013 is the same as that of the third conductive part 2021. The same shape design may enlarge the exposed area of the fourth conductive part 2022 and the third conductive part 2021 maximally. Specifically, in a case that the shape of the notch 2034 is the same as that of the fourth conductive part 2022, the fourth conductive part 2022 may be extended out completely. For the fourth conductive part 2022, the exposed area of the fourth conductive part 2022 is the own area which is limited by the fourth bearing part 2013 (generally does not exceed the edge of the fourth bearing part 2013). Therefore, in a case that the shape of the fourth conductive part 2022 is the same as that of the fourth bearing part 2013, the exposed area of the fourth conductive part 2022 may be maximized, thereby facilitating connection with the lead and improving the stability of electrical connection.

In one implementation, to balance the loudspeaker, four dampers 20 are symmetrically arranged in the loudspeaker. The second damper sheet layers 203 of two dampers 20 have notches 2034 to expose the fourth conductive parts 2022 to achieve the conduction of the second voice coil and the external circuit, and the second damper sheet layers 203 of the other two dampers 20 do not have notches 2034 and only play a role in balancing and inhibiting the swinging motion of the second voice coil 222, thereby avoiding the swinging motion of the second voice coil caused by the asymmetrical dampers 20.

Further, the first damper sheet layer 201 and the second damper sheet layer 203 are one or more of rubber, silicon rubber and a thermoplastic elastomer. The second conductive metal layer 202, the first damper sheet layer 201 and the second damper sheet layer 203 are integrally formed through a film-pressing, injection-molding or hot-pressing process. The first damper sheet layer 201 and the second damper sheet layer 203 use one or more of the rubber, the silicon rubber and the thermoplastic elastomer as raw materials, and the raw material cost is low. The first damper sheet layer, the second damper sheet layer and the second conductive metal layer 202 are integrally formed through the film-pressing, injection-molding or hot-pressing process. The process is simple and convenient for large-scale production and processing.

Figure 13:
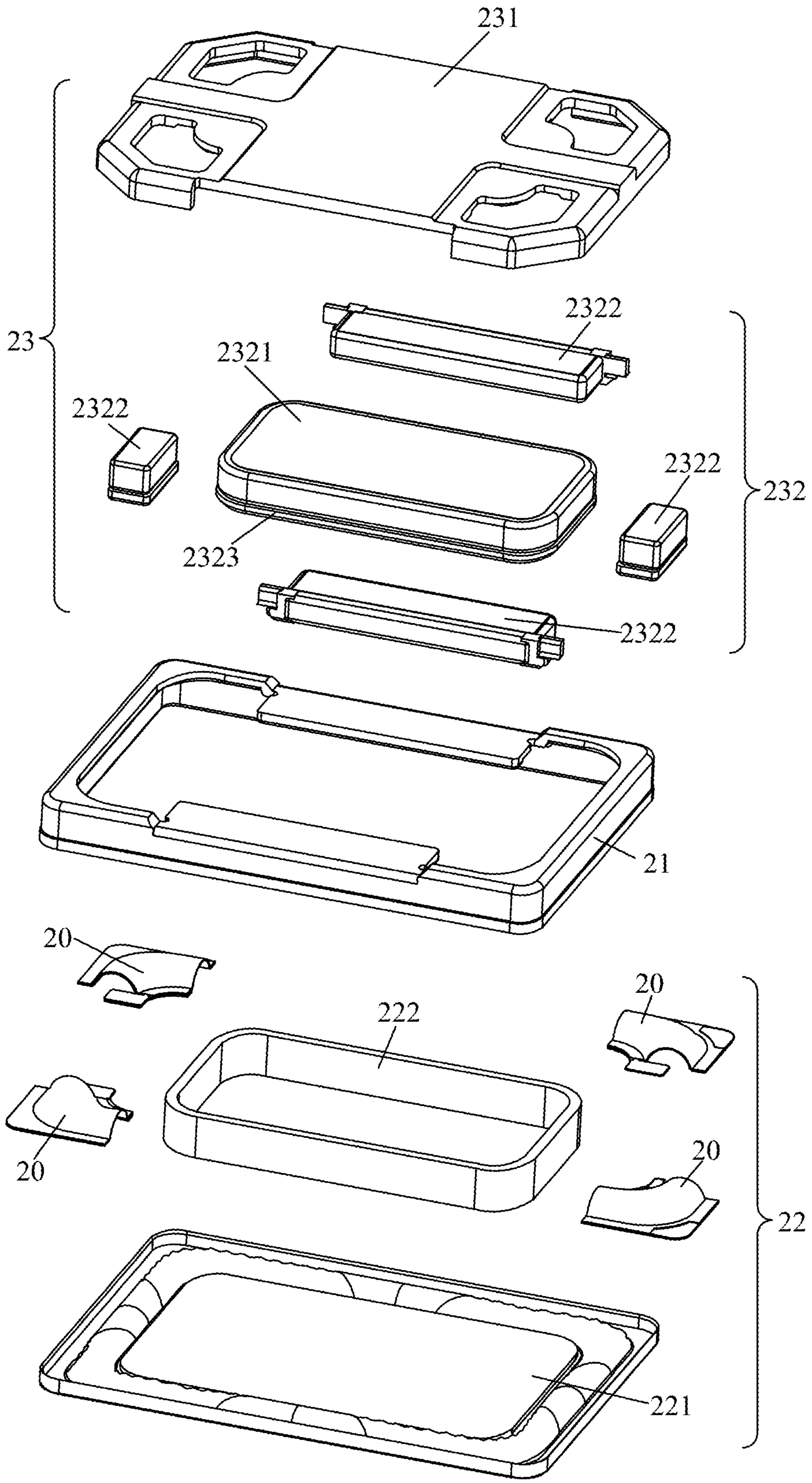
FIG. 13 is a schematic exploded view of a loudspeaker according to a second embodiment of the disclosure.

FIG. 13 is a schematic exploded view of a loudspeaker. The loudspeaker includes a basin frame 21, and a second vibrating system 22 and a second magnetic circuit system 23 which are fixed on the basin frame 21, respectively. The basin frame 21 is configured to support the second vibrating system 22 and the second magnetic circuit system 23, so that the second vibrating system 22 is driven by the second magnetic circuit system 23 to vibrate and sound.

The second vibrating system 22 includes a voice diaphragm 221 connected to the basin frame 21, a second voice coil 222 driving the voice diaphragm 221 under the action of the second magnetic circuit system 23 to vibrate and sound, and a damper 20. The damper 20 is connected to the basin frame 21 and arranged on one side of the second voice coil 222 away from the voice diaphragm 221.

Figure 11:
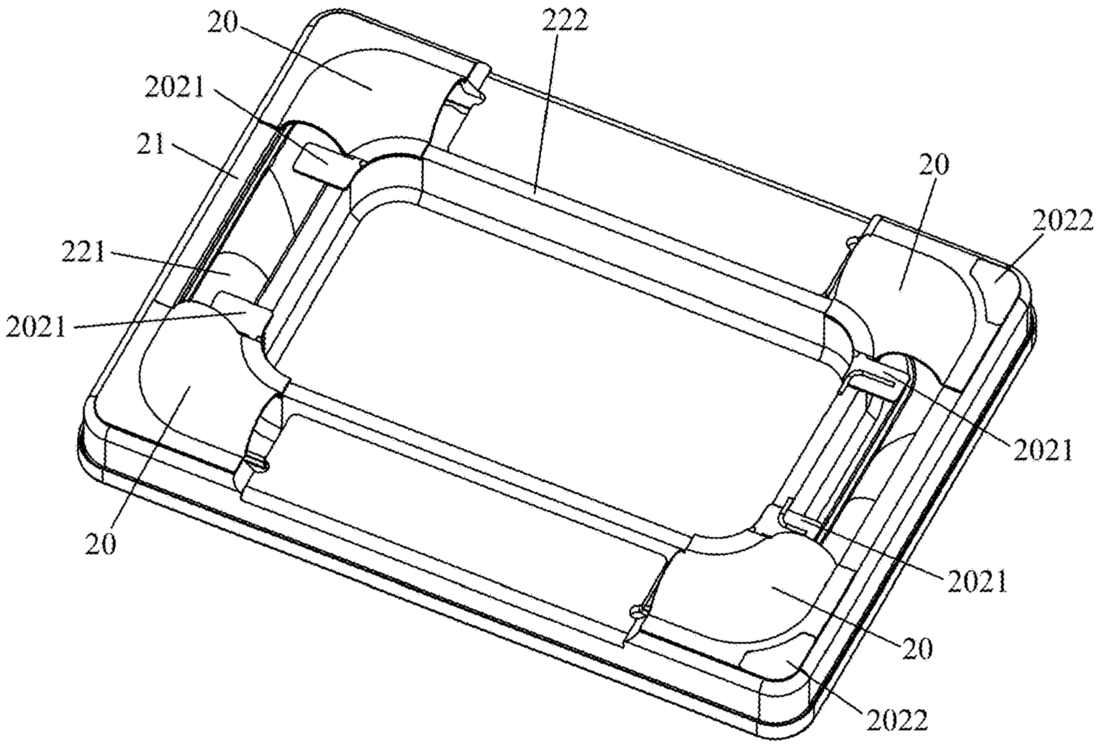
FIG. 11 is a schematic structural diagram of dampers according to a second embodiment of the disclosure fixed on a bracket and a first voice coil.
Figure 12:
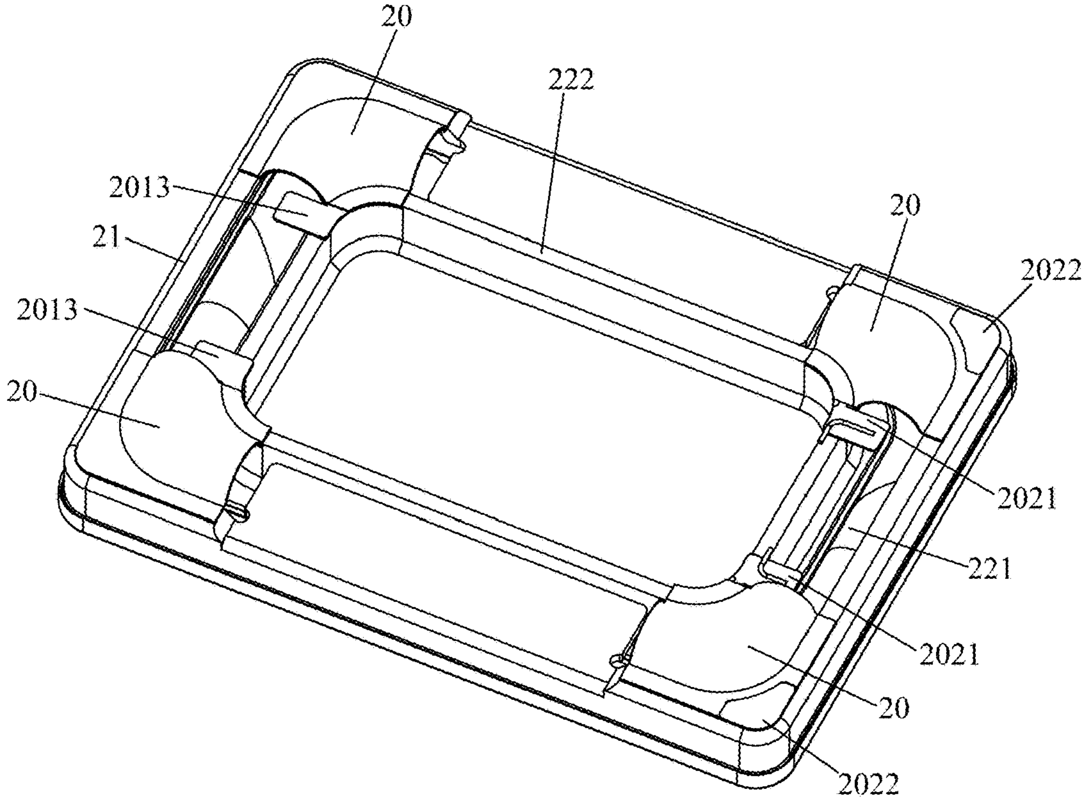
FIG. 12 is a schematic structural diagram of dampers according to a second embodiment of the disclosure fixed on a bracket and a first voice coil.

As shown in FIG. 11 and FIG. 12, the fourth fixing part 2011 of the first damper sheet layer 201 and the sixth fixing part 2031 of the second damper sheet layer 203 are connected to the second voice coil 222, and the fifth fixing part 2012 of the first damper sheet layer 201 and the seventh fixing part 2032 of the second damper sheet layer 203 are connected to the basin frame 21, thereby inhibiting the swinging motion of the second voice coil 222, keeping the second voice coil 222 at the position of the magnetic gap and preventing the second voice coil from touching the magnetic steel during motion.

The second magnetic circuit system 23 includes a splint 231 connected to one end of the basin frame 21 away from the voice diaphragm 221, and a magnetic steel 232 connected between the splint 231 and the voice diaphragm 221. Further, the magnetic steel 232 includes a second main magnetic steel 2321, second secondary magnetic steels 2322 located at the periphery of the second main magnetic steel 2321, and a pole core 2323 attached to the second main magnetic steel 2321. A magnetic gap is formed between the second magnetic steel 2321 and the second secondary magnetic steels 2322 located at the periphery. The second voice coil 222 is located in the magnetic gap. When the second voice coil 222 receives an external current signal, the second voice coil 222 vibrates under the action of the second magnetic circuit system 23 so as to drive the voice diaphragm 221 to vibrate and sound.

In this embodiment, the second vibrating system 22 includes four dampers 20 which are located at four corners of the basin frame 21 and the second voice coil 222, respectively. Each of the dampers 20 is located between two adjacent second secondary magnetic steels 2322 (that is, each of the second secondary magnetic steels 2322 is located between two dampers 20). The second damper sheet layers 203 of two dampers 20 have notches 2034, the fourth conductive parts 2022 are exposed from the notches 2034, the two fourth conductive parts 2022 are electrically connected to an incoming terminal and an outgoing terminal of the external circuit, respectively, and the two third conductive parts 2021 are electrically connected to two leads of the second voice coil 222, respectively, thereby achieving the conduction of the second voice coil 222 and the external circuit. The second damper sheet layers 203 of the other two dampers 20 do not have notches 2034, are not connected to the second voice coil 222 and the external circuit, and only play a role in balancing and inhibiting the swinging motion of the second voice coil 222, thereby avoiding the swinging motion of the second voice coil caused by the asymmetrical dampers 20.

According to the loudspeaker provided by the second embodiment of the disclosure, a flexible printed circuit board is replaced with the second conductive metal layer 202 with an extremely narrow shape, so that the damper 20 has the effect of inhibiting the swinging motion and the circuit conduction, thereby improving the reliability and/or the low-frequency performance of the loudspeaker, prolonging the life of the loudspeaker, reducing the assembling process and the cost, increasing the assembling speed, and improving the accuracy.

Figure 14:
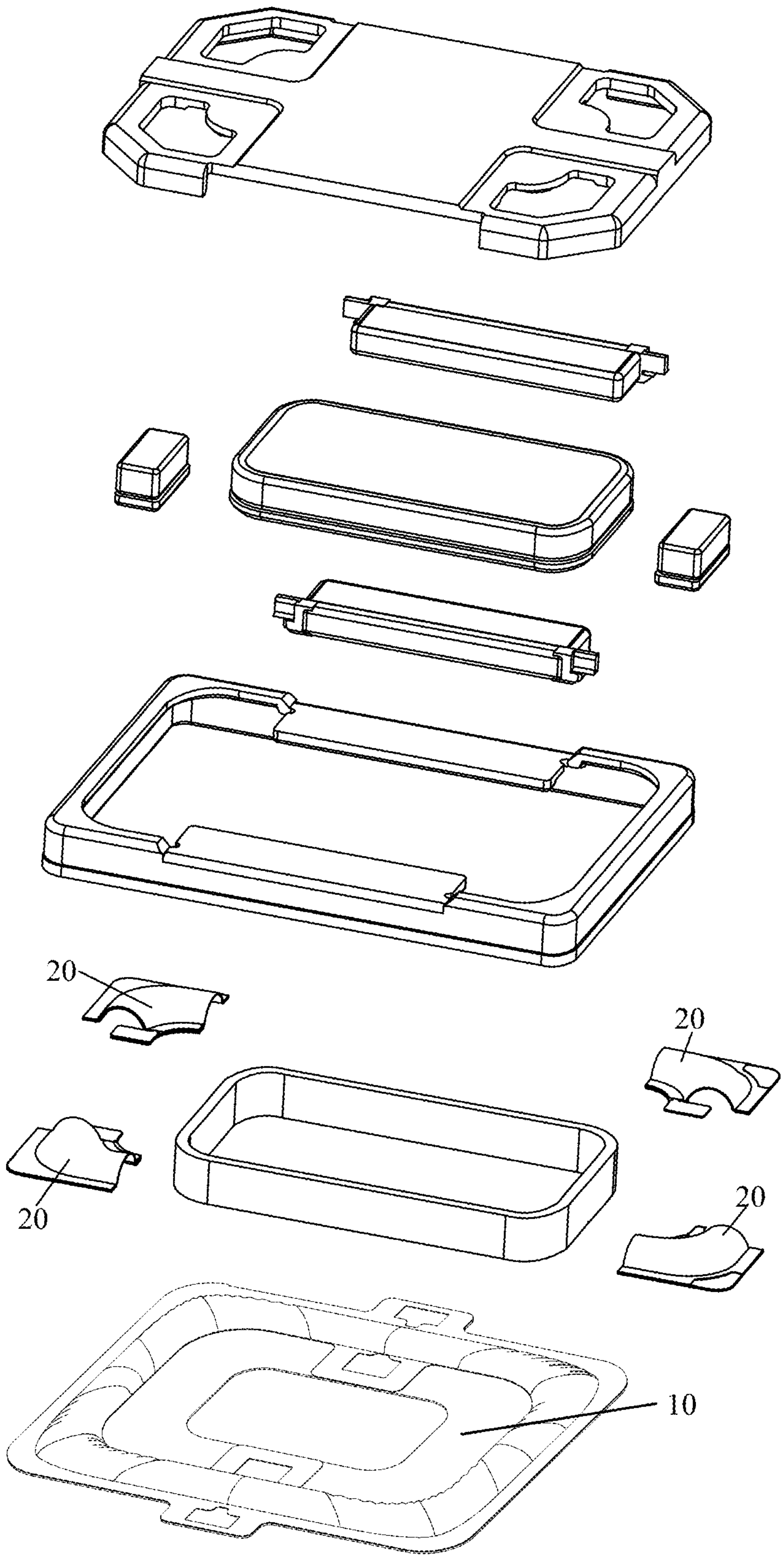
FIG. 14 is a schematic exploded view of a loudspeaker according to a third embodiment of the disclosure.

FIG. 14 is a schematic exploded view of a loudspeaker according to a third embodiment of the disclosure. As shown in FIG. 14, the loudspeaker further provided by the third embodiment of the disclosure includes a vibrating diaphragm 10 and a damper 20 as described above. It should be noted that one metal foil 1021 in the vibrating diaphragm 10 is connected to one lead of the voice coil of the loudspeaker through the first conductive part 10211, and is connected to the incoming terminal of the external circuit through the second conductive part 10212. Meanwhile, one damper 20 is connected to another lead of the voice coil of the loudspeaker through the third conductive part 2021, and is connected to the outgoing terminal of the external circuit through the fourth conductive part 2022. As an optional implementation, the second conductive part 10212 is connected to the outgoing terminal of the external circuit, and the fourth conductive part 2022 is connected to the incoming terminal of the external circuit. Therefore, through the arrangement of the vibrating diaphragm 10 and the damper 20, the space occupied by the conductive layer may be reduced to simplify the conduction design of the loudspeaker, and the conductive layer may be protected to avoid the breakage of the conductive layer.

The above descriptions are only the preferred embodiments of the present application and are not intended to limit the present application, and various alterations and changes may be made in the present application for those skilled in the art. Any modification, equivalent replacement, improvement and the like made within the spirit and principle of the present application should fall within the protection scope of the present application.

We claim:

1. A loudspeaker, comprising:

a bracket;

a first magnetic circuit system, arranged on the bracket and suitable for forming a magnetic gap region; and a first vibrating system, comprising a first voice coil and a vibrating diaphragm, wherein the vibrating diaphragm comprises a first diaphragm layer, a first conductive metal layer and a second diaphragm layer which are stacked sequentially; the first conductive layer comprises two metal foils; each of the metal foils comprises a first conductive part, a second conductive part, and a first supporting part arranged between the first conductive part and the second conductive part; and the second diaphragm layer is provided with a plurality of leaks to expose the first conductive part and the second conductive part, the first conductive part and the second conductive part are electrically connected to the first voice coil and an external circuit respectively, the vibrating diaphragm is connected to the bracket, the first conductive part is connected to a lead of the first voice coil, and the first voice coil is arranged in the magnetic gap region formed by the first magnetic circuit system to drive the vibrating diaphragm to vibrate;

wherein the loudspeaker further comprises a terminal, one end of the terminal is connected to the second conductive part, another end of the terminal is connected to the external circuit, the terminal is set as a U-shaped structure.

2. The loudspeaker according to claim 1, wherein an accommodating groove is formed in the bracket; and the vibrating diaphragm is arranged on the bracket through the accommodating groove.

3. The loudspeaker according to claim 2, wherein an accommodating channel is formed at a groove bottom of the accommodating groove; and the terminal is arranged in the accommodating channel.

4. The loudspeaker according to claim 3, wherein the accommodating channel is set as a U-shaped channel.

5. The loudspeaker according to claim 1, wherein the first diaphragm layer comprises a first fixing part, a first connecting part, a second fixing part and a first bearing part; the first connecting part connects the first fixing part and the second fixing part; the first bearing part is connected to the second fixing part and located one side away from the first fixing part;

the second diaphragm layer comprises a second bearing part, a second connecting part, a third fixing part and a third bearing part; the second connecting part connects the second bearing part and the third fixing part; the third bearing part is connected to the third fixing part and located one side away from the second bearing part;

the second bearing part coincidently covers at least part of a region of the first fixing part; the second connecting part coincidently covers the first connecting part; the third fixing part coincidently covers the second fixing part; and the third bearing part coincidently covers at least part of a region of the first bearing part.

6. The loudspeaker according to claim 5, wherein the first conductive part is arranged between the first fixing part and the second bearing part; the first supporting part is arranged between the first connecting part and the second connecting part; and the second conductive part is arranged between the first bearing part and the third bearing part.

7. The loudspeaker according to claim 6, wherein the second bearing part is provided with a first leak to expose the first conductive part, and the third bearing part is provided with a second leak to expose the second conductive part.

8. The loudspeaker according to claim 5, wherein the first connecting part has an annular structure, the first fixing part extends inwards from an inner edge of the first connecting part, the second fixing part extends outwards from an outer edge of the first connecting part, and the first bearing part extends outwards from part of a region of an outer edge of the second fixing part; and the second connecting part has an annular structure, the second bearing part extends inwards from part of a region of an inner edge of the second connecting part, the third fixing part extends outwards from an outer edge of the second connecting part, and the third bearing part extends outwards from part of a region of an outer edge of the third fixing part.

9. The loudspeaker according to claim 1, wherein the first supporting part has a slender curved sheet structure.

* * * * *